United States Patent [19]
Arai et al.

[11] Patent Number: 5,300,927
[45] Date of Patent: Apr. 5, 1994

[54] INPUT DEVICE FOR CAD

[75] Inventors: Ryuji Arai, Sapporo; Tatsuyoshi Ikuta, Tokyo, both of Japan

[73] Assignee: Mutoh Industries Ltd., Tokyo, Japan

[21] Appl. No.: 764,294

[22] Filed: Sep. 23, 1991

[30] Foreign Application Priority Data

Oct. 25, 1990 [JP] Japan .................... 2-287695

[51] Int. Cl.⁵ .................................. G09G 1/16
[52] U.S. Cl. ........................ 345/157; 345/173; 345/127
[58] Field of Search ............ 340/709, 712, 721, 707, 340/731, 706

[56] References Cited

U.S. PATENT DOCUMENTS

| | | | |
|---|---|---|---|
| 4,257,044 | 3/1981 | Fukuoka | 340/731 |
| 4,618,858 | 10/1986 | Belch | 340/721 |
| 4,686,522 | 8/1987 | Hernandez et al. | 340/721 |
| 4,698,625 | 10/1987 | McCaskill et al. | 340/709 |
| 4,751,507 | 6/1988 | Hama et al. | 340/721 |
| 4,947,156 | 8/1990 | Sato et al. | 340/712 |
| 4,955,811 | 7/1988 | Slavin et al. | 340/709 |

*Primary Examiner*—Ulysses Weldon
*Assistant Examiner*—Gin Goon
*Attorney, Agent, or Firm*—Sughrue, Mion, Zinn, Macpeak & Seas

[57] ABSTRACT

Below a transparent board-like digitizer, a screen of the same size as that of the digitizer is placed. Scenes of a display device is displayed on the screen. A co-ordinates standard of the digitizer is set to be identical with that of the screen. Thereby, the point indicated on the digitizer of a first cursor device is shown at a position corresponding to that of the point indicated by means of the cursor. The screen displays a right-angle scale lines controlled by a second cursor device on the digitizer. The right-angle scale lines can carry out parallel movements and rotations on the screen. In a drafting mode of the digitizer, the operator hits each points shown on the digitizer through the first cursor device on the basis of, or with reference to the right-angle scale lines in order to draw patterns on the screen. The center of the right-angle scale lines is moved to, or into, an area of the original pattern on the screen. The area intended to enlarged, by using the second cursor device in order to make the control apparatus to of an enlargedly displaying or indication mode. Thus, an enlarge indication area is formed on the screen using the center of the right-angle scale lines as a standard. In the area, an enlarged pattern or picture is displayed overlapping on the original one with the original width of the lines and the enlarged length of the lines of the original pattern. Accordingly, the operator can use the first cursor device to draw patterns in the enlarged indication area.

2 Claims, 14 Drawing Sheets

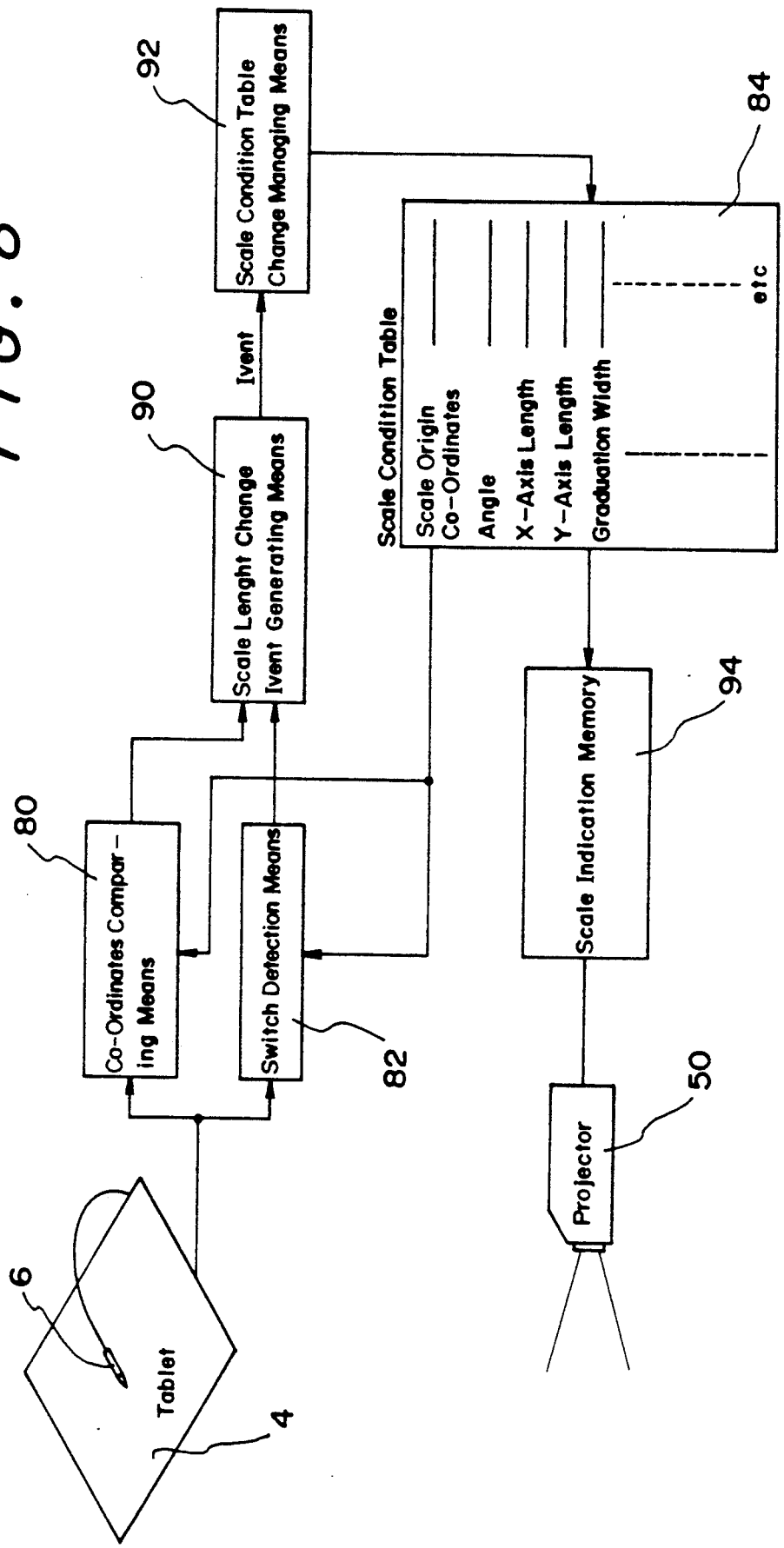

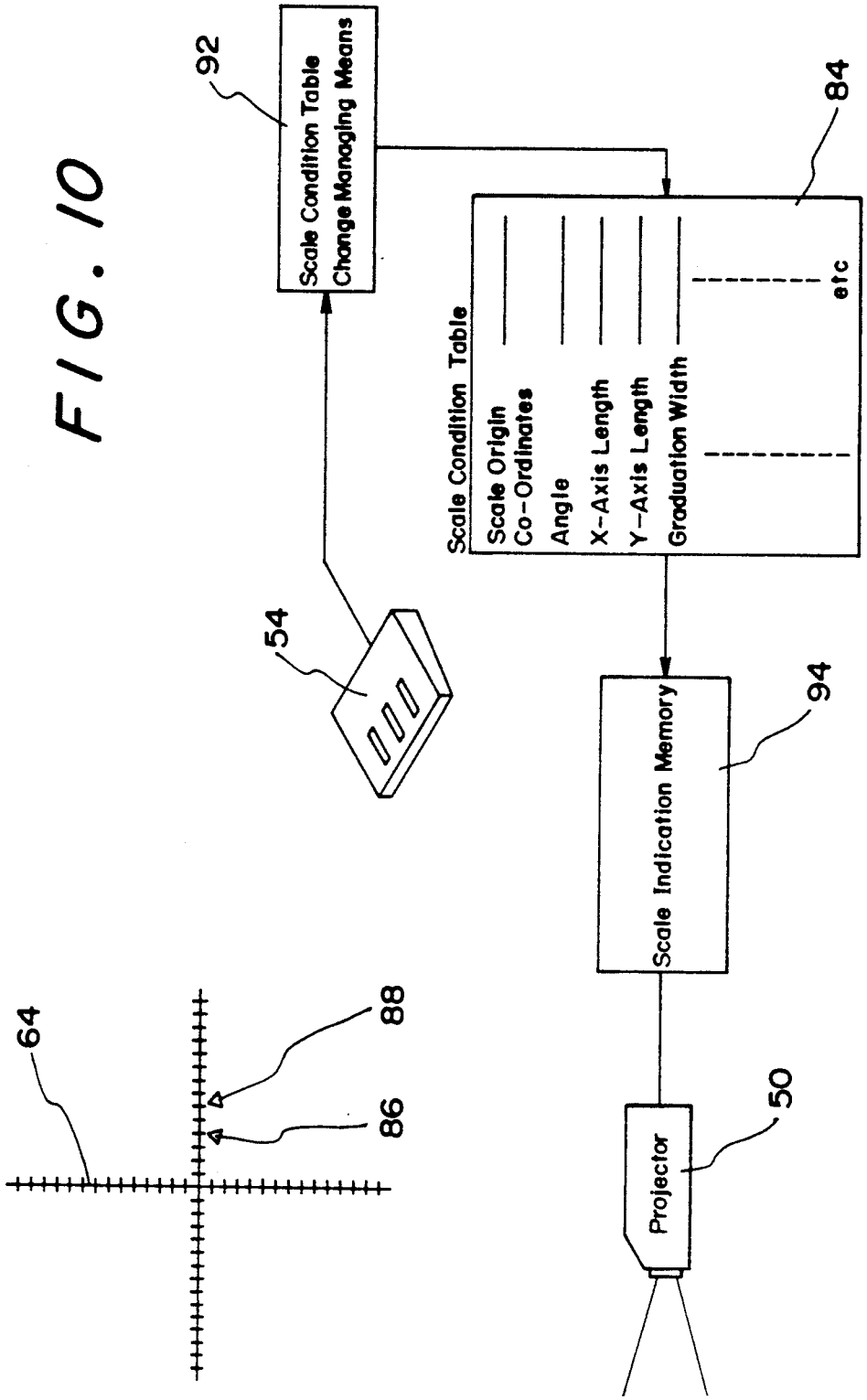

INPUT DEVICE FOR CAD

BACKGROUND OF THE INVENTION

The present invention relates to a computer aided designing and drafting system or drawing co-ordinates input device used in CAD.

Japan Patent Publication No. 62-59329 discloses a co-ordinates input device of a type of integrated digitizer and display device composed by overlapping a position detection tablet or a digitizer on the display device in order to display patterns or shapes on the display device. The applicant of this application has developed another input device for CAD provided with a digitizer and a display device integrated for displaying right angle scale lines with graduation in the display device, and drafting a drawing on the display device on the basis of these right angle scale lines. It is well known that an input device used for CAD indicating an enlarged area of drawing lines on the display device and enlarging the area to enlarge it.

As shown in FIG. 19(A) depicting a conventional input device for CAD in which while graduated right angle scale lines are displayed on the screen of the display device, patterns are drawn on the screen, an enlarge indication area 98 is set in the screen 96, the pattern 100 shown in the screen 96 is enlarged together with the right angle scale lines 64 and they are displayed on the screen as shown in FIG. 19(B). It is noted that because the pattern is simply enlarged in scale, the pattern 100 and the right angle scale lines 64 in the enlarged area 102 are enlarged in their length and width of these lines. Consequently, when you want to draft fine drawing or treat the pattern finely on the enlarged screen 104, such operation and treatment is disadvantageously difficult due to large width of lines shown in the display.

SUMMARY OF THE INVENTION

The object of the present invention is to provide an input device for a computer-aided-designing and drafting system which device comprises a means showing a graduated right angle scale lines on the screen of the display device, a second cursor device for controlling the right angle scale lines, a control means for moving the right angle scale lines in parallel and in circle on the screen according to an output signal of the second cursor device, a co-ordinates value multiply enlarge rate counting means for setting an enlarge indication area of the predetermined range in regard to the center of the right angle scale lines on the screen of the display device; setting an area-to-be-enlarged due to the enlarge rate of the enlarge indication area; multiplying the co-ordinates value of the pattern in the area-to-be enlarged by the enlarge rate in order to determine an enlarge co-ordinates system having a fixed line width, a display data overlapping mans for composing or overlapping the enlarged display data of the co-ordinates value multiply enlarge rate counting means an ordinal display data in order to display the composite data on the screen of the display device, and a memory means for temporarily storing a pattern data in the enlarge indication area as a pattern data of an ordinal co-ordinates system, in order to solve the problem of the conventional device above.

DESCRIPTION OF THE DRAWINGS

FIG. 8 is a block diagram of the input device for CAD; FIG. 9 shows the right angle scale lines; FIGS. 10 to 12 are respectively, block diagrams of the input device for CAD.

DESCRIPTION OF THE PREFERRED EMBODIMENTS

The structure of the present invention will be described in detail with reference to its embodiments shown in the accompanying drawings.

Figure 16:
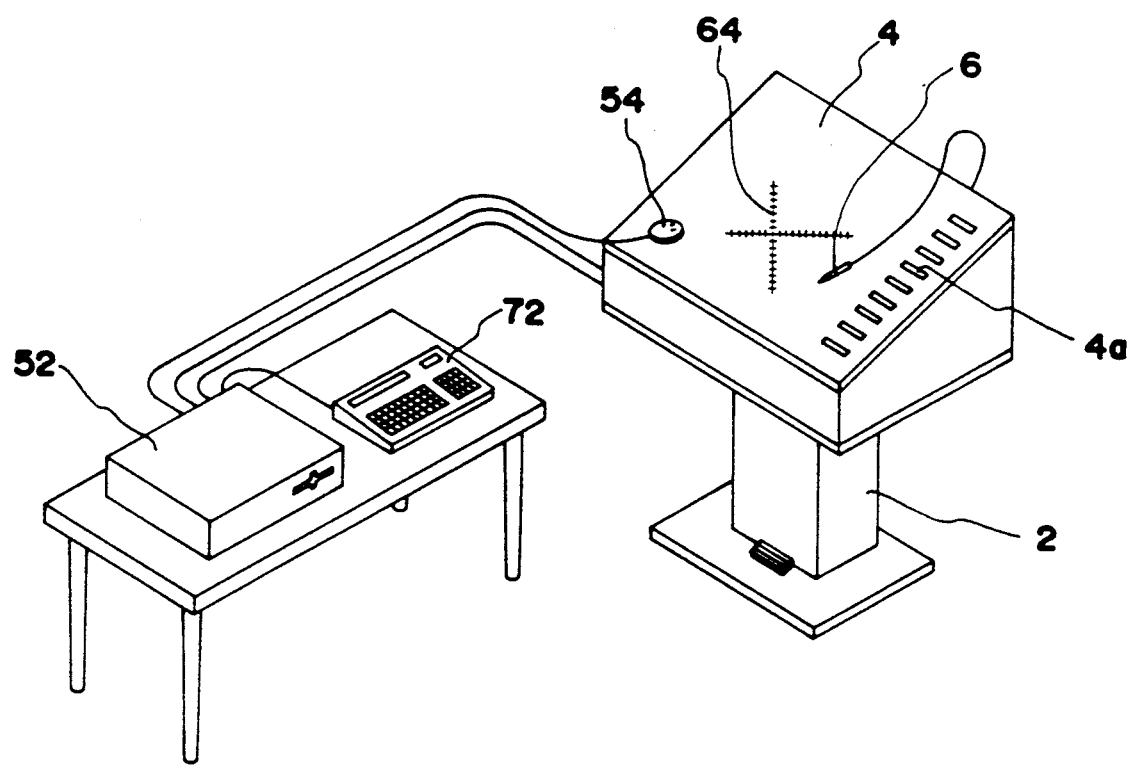
FIG. 16 is a whole perspective view of the display device.

As shown in FIG. 16, a drafting desk 2 has a supporting frame and a transparent tablet type digitizer 4 which is supported on the frame. The digitizer 4 is set to have the same size as that of an ordinal drafting board and has a flat face, such as the drafting board. According to the digitizer 4, when an absolute type cursor device 6, such as a stylus pen, connected to a control apparatus (not shown) of the digitizer 4 is used by an operator to indicate a point on the digitizer 4, an absolute co-ordinate signal of the point indicated is translated to paper co-ordinates data through a driver 8 and a co-ordinates translation means 10 shown in FIG. 12, and the translated data is supplied to a cursor pattern generator 12. The paper-coordinates data means real data plane co-ordinates used as a standard of a drafting program. The cursor pattern generator 12 supplies cursor pattern data to a co-ordinates translation means 14. The co-ordinates translation means 14 translates cursor pattern data to display co-ordinates data and supplies them to a display driver 17, so that a cursor 15 corresponding to the indication position situated on the digitizer 4 of the cursor device 6 is displayed on the screen of the display device and the cursor 15 (see FIG. 14) is displayed or indicated on the screen 16 (see FIGS. 12, 13) through a projector 50. When a front end of the cursor device 6 comes in contact with the surface of the digitizer 4 making a hit, the positional co-ordinates data of the cursor device 6 is supplied to a drafting means program means 18. Consequently, the drafting program means 18 outputs drafting data according to a drafting command position signal indicated or selected previously by the cursor device 6 from a command menu. The drafting data is translated into the display co-ordinates data by means of a co-ordinates translation means 20 and the data is supplied to a display driver 17, so that a pattern according to the drafting program is displayed. The drafting command can be called out by indicating a command menu region 4a (see FIG. 14) of the digitizer 4. The screen 16 is set so as to have substantially the same size as that of the digitizer 4 and situated near the rear face of the digitizer 4. As shown in FIG. 13, a display device 22 consists of a cathodes ray tube of green color, and a lens 24, a light valve 26, and a polarized prism 28 are arranged in front of the display device 22.

The light valve 26 translates images entered from one side of the valve 26 into clear images and shines the clear images to its other side. The construction and principle of the light valve 26 is disclosed in U.S. Pat. No. 3,723,651 and U.S. Pat. No. 4,343,535, so there is no detailed description of the valve herein. A co-operative operation of the light valve 26 and the input of a xenon lamp 30 translates the image of the display device 22 into a clear image, thus, the clear image is shone through the polarized prism 28. The image shone through the polarized prism 28 is enlarged and projected on the screen 16 through a half mirror 32 and a lens 34. A display device 36 consists of a cathode ray tube for red color, a lens 38 and a light valve 40 are arranged in front of a screen face of the display device 36. The light valve 40 faces the polarized prism 28. A display device 42 consists of a cathode ray tube for blue color, and a lens 44, a reflection mirror 46, and a light valve 48 are situated in front of the screen of the display device 42. The light valve 48 faces the polarized prism 28. Lenses 28, 38, 44, light valves 26, 38, 48, lamp 30, polarized prism 28, half mirror 32, and reflection mirror 46 construct a reflection type enlarging projection mechanism or projector for enlarging and projecting an image on the screens of the display devices 22, 36, 42 on the screen 16. An enlarging rate of the enlarging projection mechanism is determined so as to make the position of the cursor device 6, as indicated on the digitizer 4, and the other position of the cursor 15 on the screen 16 fixed by the co-ordinates signal of the previous position agree. The screen 16 and the projector 50 are contained in the box or console of the drafting stand 2. The digitizer 4 and display devices 22, 36, and 42, respectively, are connected to a control apparatus 52 consisting of a host CPU. A cursor device 54 is an increment-type device having a mouse and outputting movement distance, and connected to a driver 56.

Apparently, the driver 56 is connected to a changed-length value.changed-angle value translation means 60 and a co-ordinates translation means 58 through a pair of switch contacts a, b. Changing-over of the switch contacts a and b can be done by operating a switch key of the cursor device 54. A cursor pattern generator 62 indicates right angle scale lines 64 having the graduation shown in FIG. 14. The right angle scale lines 64 is adapted to change the angle according to a content of a cursor parameter table 66. The cursor pattern generator 62 is connected to a display driver 17 through a co-ordinates change means 68. 72 is a keyboard. The cursor pattern parameter table contains therein various data of positional co-ordinates, angle of the origin or cross point of the right angle scale lines 64, X-axis length and Y-axis length of line pattern, and graduation width.

An operation of the system above will be described.

Figure 14:
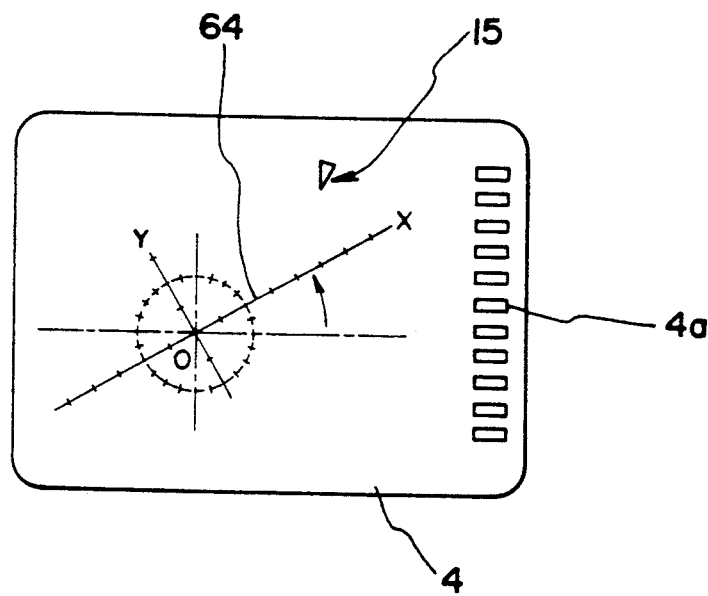
FIG. 14 is a plan view of the screen.
Figure 15:
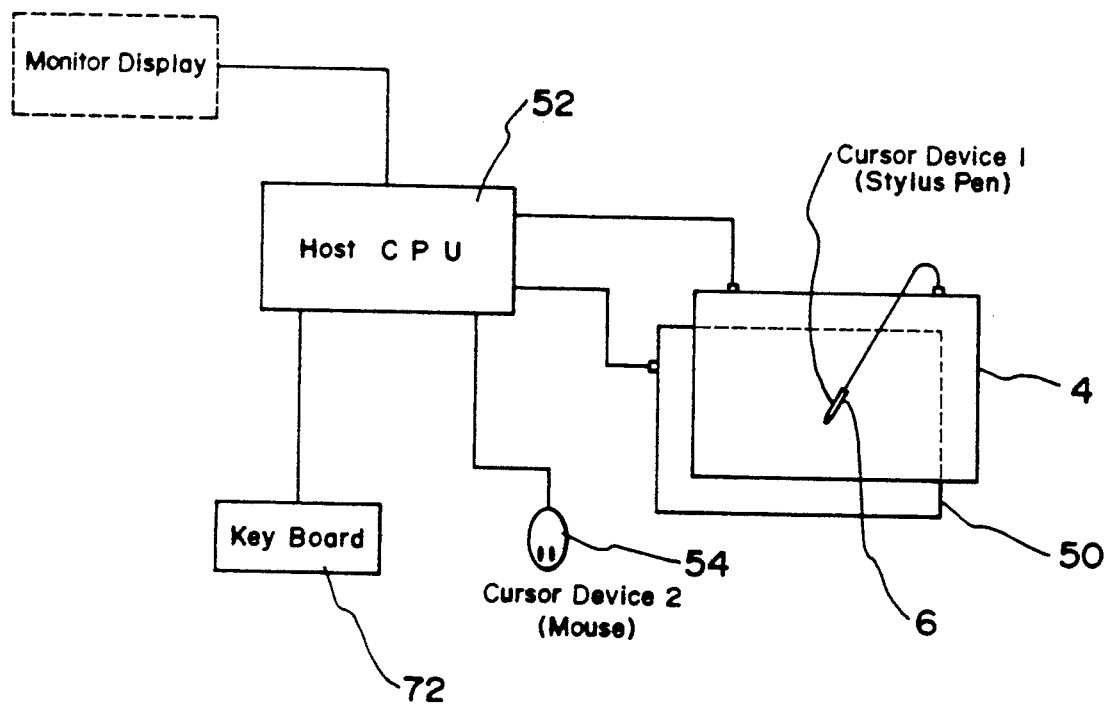
FIG. 15 is a block diagram of the input device.
Figure 17:
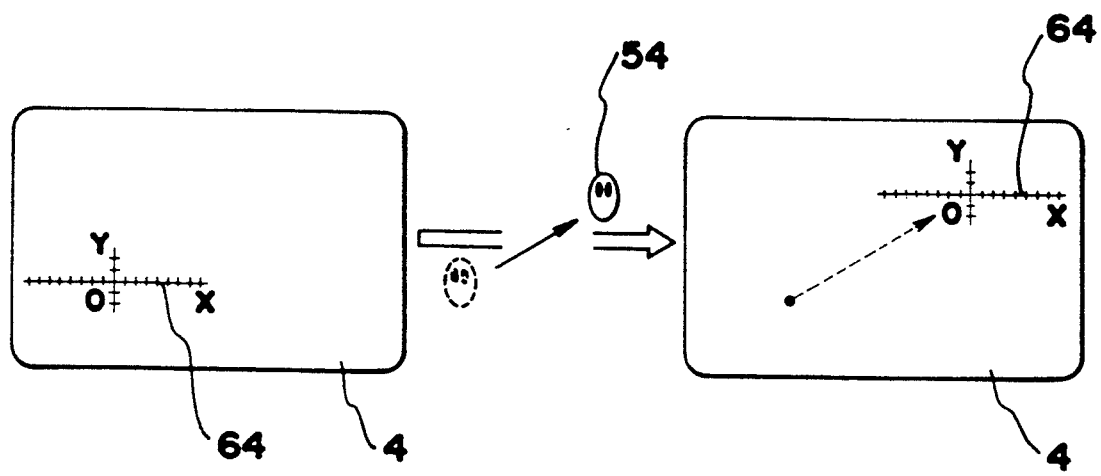
FIGS. 17 and 18 show operation of the input device.
Figure 18:
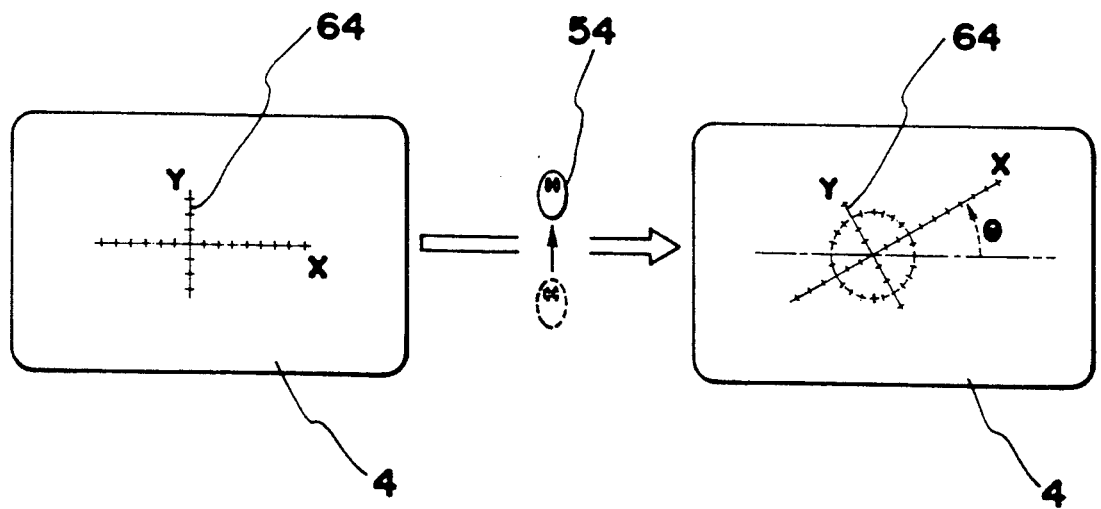
Figure 19:
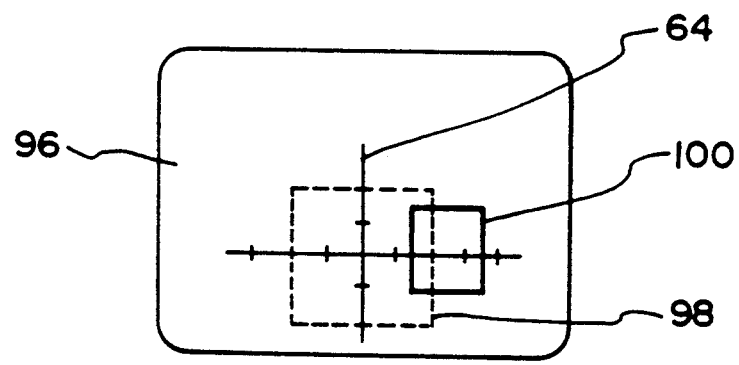
FIG. 19(A) and (B) show the conventional technology.
Figure 19:
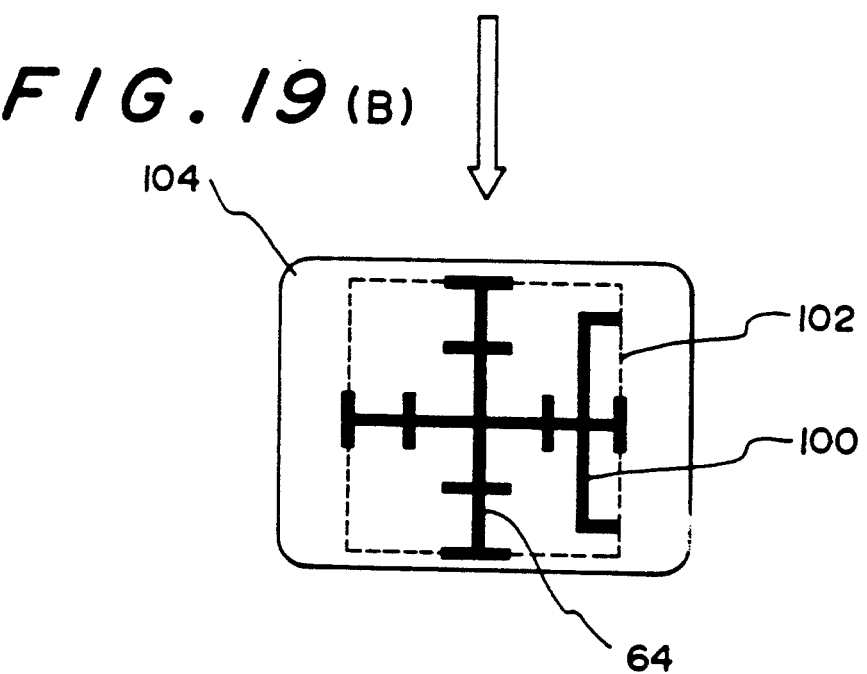

A right-angle scale line 64 displayed on the screen 16 can be operated by the cursor device 54. When no key of the cursor device 54 is pressed, the switch 70 is kept in a condition being connected to a (a) contact. In the condition, when the cursor device 54 is moved along an XY direction on the digitizer 4 or other table's plane face, output change values of $\Delta x$ and $\Delta y$ of the cursor device 54 is translated as they are into a parallel movement of the origin position of the right angle scale lines 64 and is indicated as shown in FIG. 17. When the mouse key of the cursor device 54 is pressed, the switch 70 joins a (b) contact. When the cursor device 54 is moved along the XY direction on the table plane face while pressing the mouse key, the change or translation means 60 picks up length change value of $\Delta y$ or $\Delta x$ of the cursor device 54 in order to change linearly, the change value of $\Delta y$ or $\Delta x$ to an angle $\Delta \theta$ using a function ($f(\Delta y)$). The angle change value $\Delta \theta$ is added to the angle $\theta$ at present on parameter table 66. The cursor pattern generator 62 rotates the right angle scale lines 64 by a volume for the angle $\theta$ according to the content of the parameter table 66 and it is indicated on the screen 16 as shown in FIG. 14. The angle $\theta$ of the right angle scale lines 64 is shown on the screen 16 by the drafting programming means 18., While the operator indicates a command region 4a on the digitizer 4 by the front end of the cursor device 6 in order to order, for example, a green straight line command to the drafting program means 18 of the control apparatus 52 indicating two points A and B on the digitizer 4 through the front end of the cursor device 6, consequently, the drafting co-ordinates signals of the two points A and B is inputted into the drafting program means 18. The control apparatus 52 makes a drafting data on the basis of inputted co-ordinates signal and the drafting data is translated into a display co-ordinates data through the co-ordinates change means 20, controlling the display apparatus 22 on the basis of the co-ordinates data. Consequently, a straight line AB is shown on the screen of the display device 22 on the basis of XY co-ordinates axes (screen co-ordinates) of the image face. The image on the screen of the display device 22 is projected toward the polarized prism 28 through the light valve 26, and the image on the screen is enlarged and projected on the screen 16 through the polarized prism 28, the half mirror 32, and the lens 34. Both the origin points of the XY co-ordinates standards of this enlarged projected image and of the digitizer 4 agree with each other, as well as the standards of the XY axis length agree with each other in 1:1. As a result, when the operator indicates points A and B on the digitizer 4 through the cursor device 6, a green straight line connecting two points A and B indicated is shown in real time and real size on the digitizer 4. Using the same procedure, red and blue and other colors straight lines, circles, and points can be drafted at the position indicated on the digitizer.

Data inputted into the control apparatus 52 is stored in a treatment device of the apparatus 52 before being outputted on an XY plotter. Drafting is done through the cursor device watching the right angle scale lines 64 on the screen 16. The right angle scale lines 64 corresponding to a right angle scale or a pair of straight rulers installed on a head of the universal parallel ruler device, and the cursor device 6 corresponds to a writing instrument. The operator manipulates the cursor device 54 to carry out parallel movement and angle change of the right angle scale lines 64 in a manner of the manipulation of the head of the universal parallel ruler device, and other cursor device 6 to draft a drawing. It is apparent from the above explanation that the cursor pattern generator 62 is a means for displaying right angle scale lines on the screen of the display device, and the cursor parameter table 66, the change length value.changed angle value translation means 60 and the cursor pattern generator 62 is a control means for moving in parallel and rotating the right angle scale lines 64 on the screen 16. Although the scene of the display device is projected on the screen 16 through the enlarged projecting mechanism 50 according to the structure above, a display device having a display of the same size as the digitizer 4 may be arranged below the digitizer 4.

A parallel movement function of the right angle scale lines will be described in detail with reference to FIG. 10.

Figure 11:
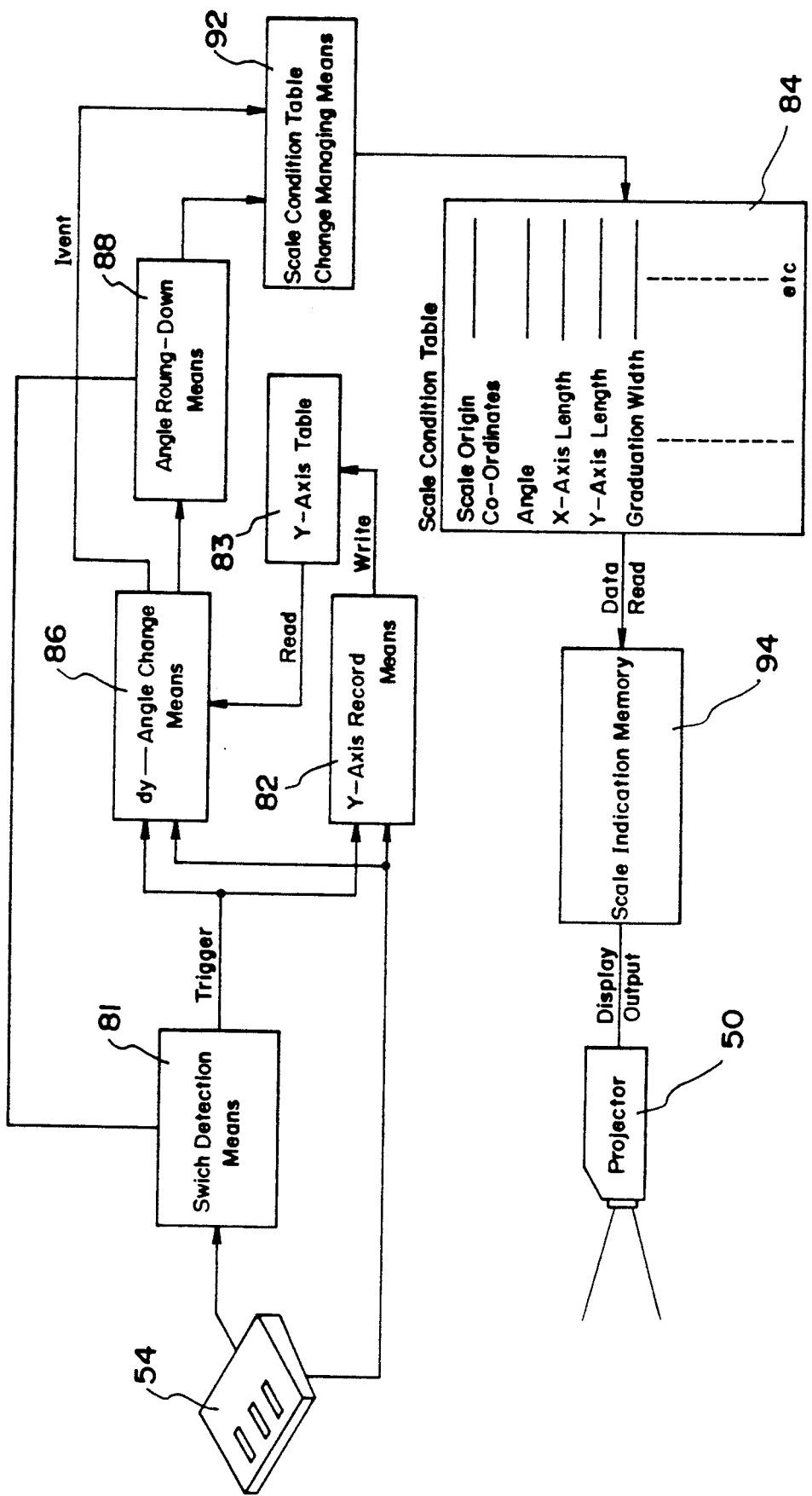
Figure 12:
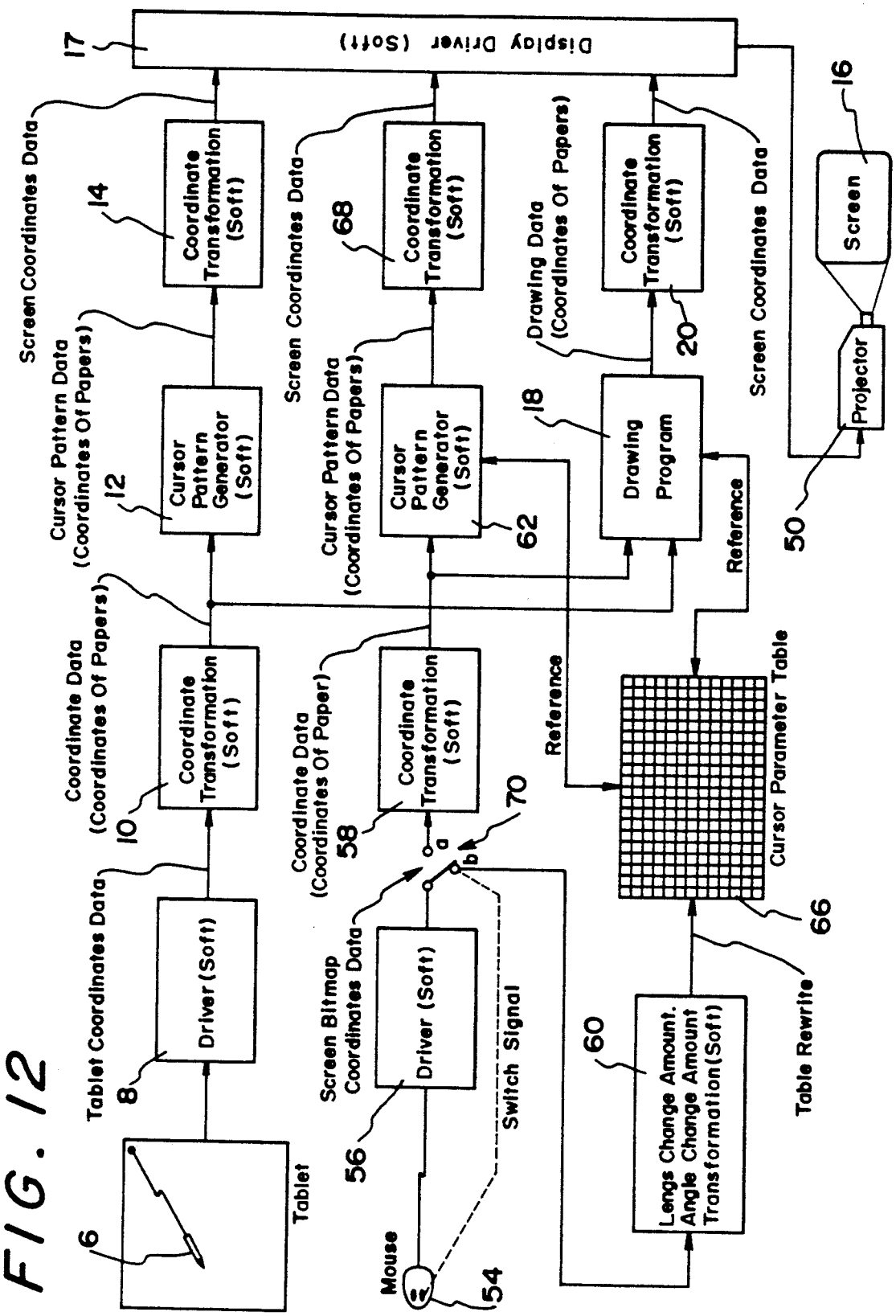
Figure 13:
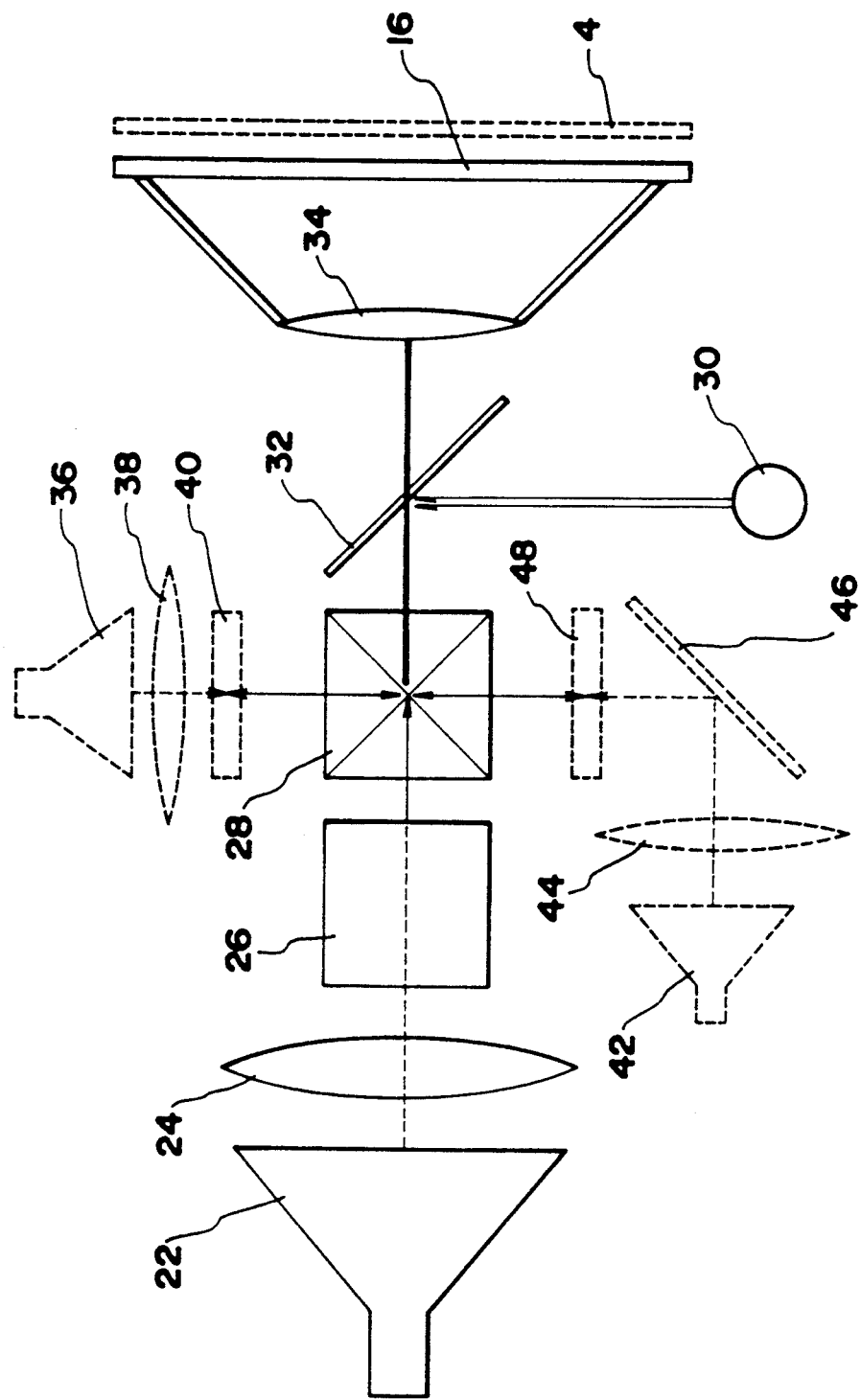
FIG. 13 is an explanation of the display device.

An incremental co-ordinates signal from the cursor device 54 is sent to a scale condition table change managing means 92 through a contact (a) of the switch 70 (see FIG. 12). The managing means 92 sequentially replaces or newly writes the co-ordinates of the origin point of the right angle scale lines 64 of the scale condition table 84 corresponding to the cursor parameter table 66 shown in FIG. 11 according to changes of the co-ordinates signal of the cursor device 54. The contents of the scale condition table 84 are read-out on the scale indication memory 94, and the right angle scale 64 is displayed on the screen 16 through the screen of the display device and the projector 50. The origin and the center point of the right angle scale lines 64 are replaced by a new origin and point according to the change in the output from the cursor device 54, thus the right angle scale lines 64 move in parallel on the screen 61.

Next, the rotation control function of the right angle scale lines will be described in detail with reference to FIG. 11.

The switch detection means 81 shown in FIG. 12 corresponding to the switch 70, and the angle change means 86, y-axis table 83, y-axis recording means 82, scale condition table change managing means 92, respectively correspond to the changed length value.- changed angle value translation means 60 shown in FIG. 12. An angle rounding-down means 88 is used to the minimum unit angle rounding-down function which is not shown in FIG. 12 and newly added. The means 88 rounds down the angle signal from the angle change means 86 every the minimum unit and outputs the resultant to the scale condition table change managing means 92. For example, when the minimum unit of angle is 0.5 degree, and the angles change means 86 outputs angle from 0 to 5 degree, the angle rounding-down means 88 receives signals from the angle change means 86 outputting angle signals of 0.0, 0.5, 1.0, 1.5, 2.0, 2.5, 3.0, 3.5, 4.0, 4.5, 5.0.

When the angle changing mouse key of the cursor device 54 is turned ON, the resultant signal from the mouse key is detected by the switch detection means 80, outputting a trigger signal which makes the angle change means 86 and the y-axis recording means 82 operative. The co-ordinates output of Y-axis component of the XY co-ordinates output from the cursor device 54 is supplied to the y-axis recording means 82 and the angle change means 86 when the mouse key is turned ON. The Y-axis component co-ordinates output is written on the y-axis table 83. The angle change means 86 picks up the change value of the Y-axis component co-ordinates output and translates this change value to an angle value. The angle signal outputted from the angle change means 86 is inputted into the angle round-down means 88, rounding-down the angle signal to the minimum unit angle, and the resultant angle is supplied to the scale condition table change managing means 92. While, an event signal of ordinal angle change mode for changing angles from the angle change means 86 is supplied to the scale condition table change managing means 92. The scale condition table change managing means 92 replaces old angle data of the scale condition table 84 by new data of the table 84 on the basis of an outputted angle signal from the angle round-down means 88. This new angle data of the right angle scale 64 is read out in the right angle scale line display memory 94 and the content of the memory 94 is displayed on the screen of the display device, as well as on the screen 16 through the projector 50.

The construction of the scale length change means will be described in detail with reference to FIG. 8.

A co-ordinates comparing means 80 and the switch detection means 82 are connected to the digitizer 4 for outputting the position signal of the carsol device 6. As described above, the scale condition table corresponding to the carsol parameter table 66 contains such data as a center point, angle, X-axis length, Y-axis length, and graduation width of the right angle scale lines 64. Near the center point of the right angle scale lines 64 on the digitizer 4, expandable switch indicators 86 and 88 are seen as shown in FIG. 8. The indicators 86 corresponds to the command shortening the line length of the right angle scale lines 64. The co-ordinates comparing means 80 reads out data of the center point and the angle data of the right angle scale lines 64 from the scale condition table 84 in order to recognize the position of the center point of the right angle scale lines 64 on the digitizer 4, as well as recognize the positions of the expandable switch indicators 86 and 88 relative to the right angle scale line 64. Hitting the indicator 88 through the carsol device 6 by the operation, the hit signal is detected by the switch detection means 82. The position signal determined by making the X-axis line, the Y-axis line and the center point of the right angle scale lines 64 as its standard, is inputted to the scale length change event generating means 90. The event generating means 90 recognizes a hitting of the indicator 88 by the outputs of the co-ordinates comparing means 80 and of the switch detection mans 82, and inputs an extended event signal to the scale condition table. The table change managing means 92 inputs a scale length data replacing signal into the scale condition table 84 on the basis of the extended event signal and rewrites the data of the X-axis length and the Y-axis length of the table 84 along a data extendable direction. The extended value of the data of the scale length is determined by a length of hit hour on the indicator 88 by the cursor device 6. The X-axis and Y-axis lengths data rewritten of the right angle scale line 64 are read out in the right angle scale lines indication memory 94. As a result, the content of the memory 94 is displayed on the screen of the display device, as well as on the screen 16 through the projector 50. When the indication 86 is hit by the cursor device 6, the data of X-axis and Y-axis lengths of the scale condition table 84 are rewritten to their shrinking direction and the data rewritten are displayed on the screen 16.

The outline of an enlarge display overlapping means of the gist of the present invention will be explained with reference to FIGS. 4 to 7.

Figure 4A:
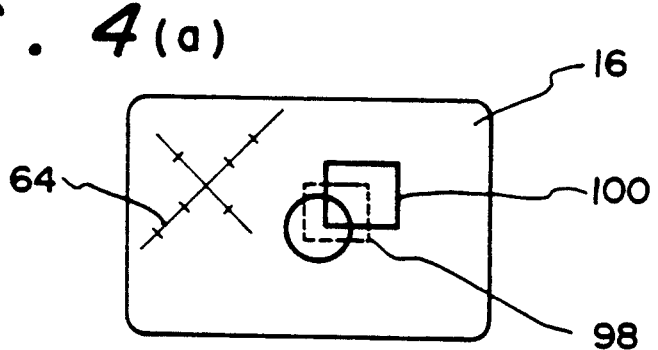
FIGS. 4(a)-4(d) to FIGS. 7(A)-7(B) respectively depict explanations of the operation of the input device for CAD.
Figure 4B:
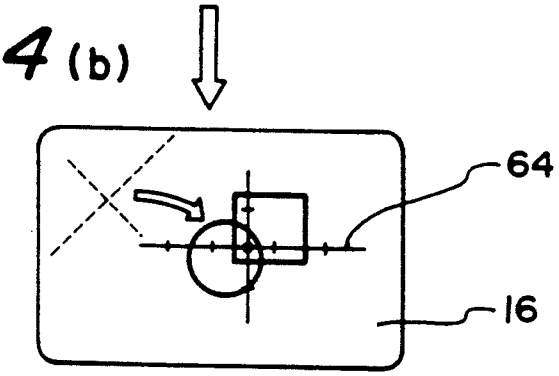
Figure 4C:
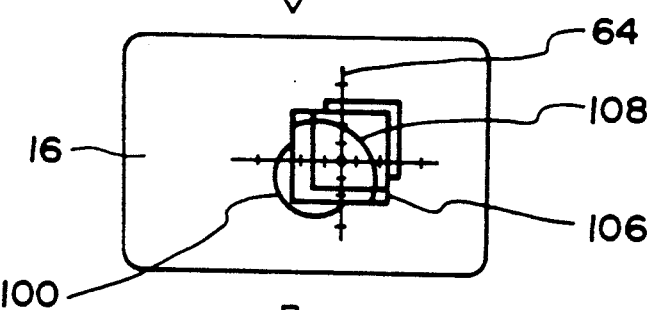
Figure 4D:
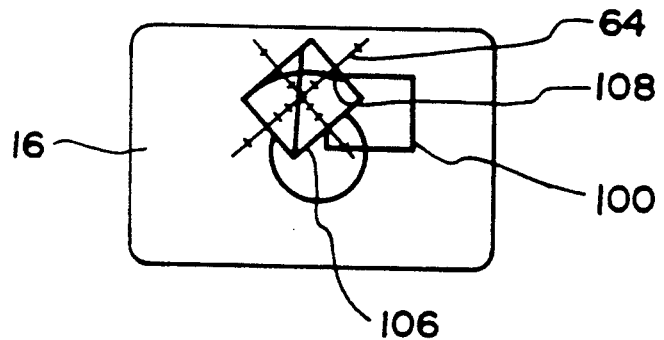

When any portion of the pattern or shape 100 in the screen 16 of the display device as shown in FIG. 4(a) is adapted to enlarge into the area 98, the center of the right angle scale lines 64 is moved by the cursor device 54 as shown in FIG. 4(b). After the right angle scale lines 64 is moved, the control apparatus is made of an enlarge display mode as shown in FIG. 4(c). Then, an enlarged shape 108 is displayed with an original shape 100 overlapped in the enlarge display area 106. The line width of the enlarged shape 108 and the right angle scale lines 64 situated in the enlarge display area 106 is the same as that of the original shape.

Figure 5:
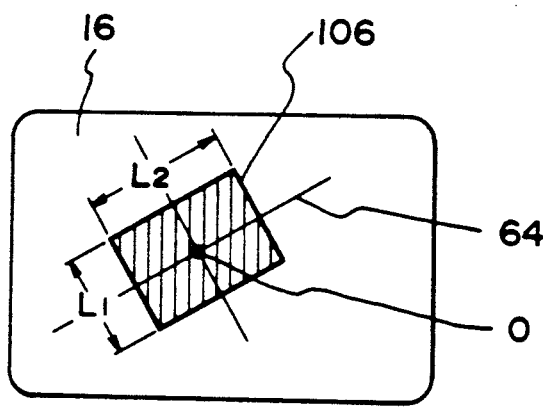
Figure 6:
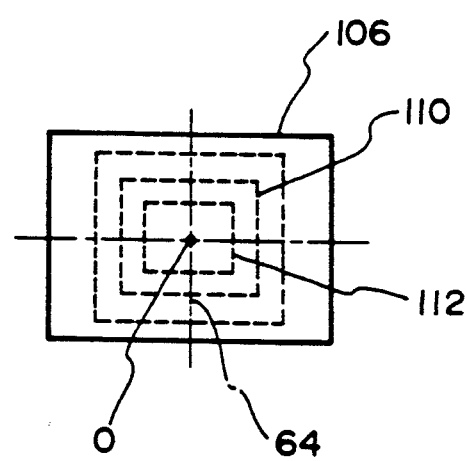
Figure 7:
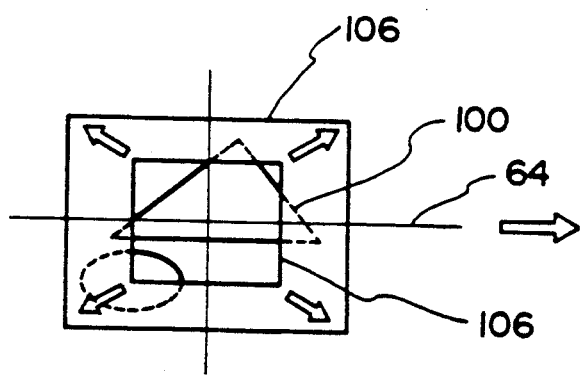
Figure 7:
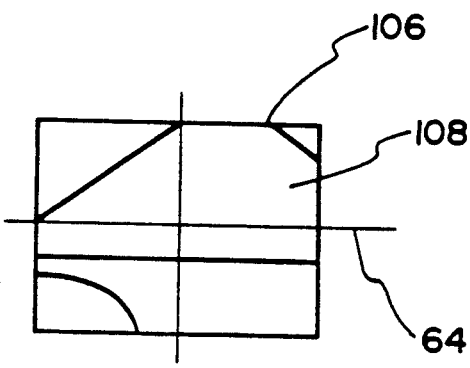

When the right angle scale lines 64 are moved as shown in FIG. 4 (d) in the enlarge display mode, simultaneously, the enlarge display or indication area 106 is moved and the shape or image situated in the area 106 is enlargedly displayed. In consequence, it is possible to use another cursor device 6 in order to treat the shape in the enlarge display area 106. As shown in FIG. 5, when an enlarge display mode is selected within the range of L1 and L2 with the standard of the center O of the right angle scale lines 64, the shape within the range previously set in regard to the center O of the right angle scale lines 64 or the areas-to-be-enlarged 110 and 112 is enlarged and displayed. The area 110 shows a set range for enlarging it two times, and the area 112 shows a set range for enlarging it three times. When the right angle scale lines 64 move, the enlarge indication area 106 is moved cooperatively. An enlarging rate of the shape is selected by the device signal. The areas 110 and 112 to be enlarged are determined by the enlarging rate. Concretely, as shown in FIG. 7, the original shape 100 within the enlarge display area 106 is clipped by the enlarge indication area 106. The co-ordinates of the clipped original shape 100 is enlarged by the predetermined multiplier, the range of the original shapes 100 clipped by the enlarge indication area 106 is set to the same size as that of the enlarge indication area 106, an enlarged shape 108 is shown in the enlarge indication area 106.

Figure 1:
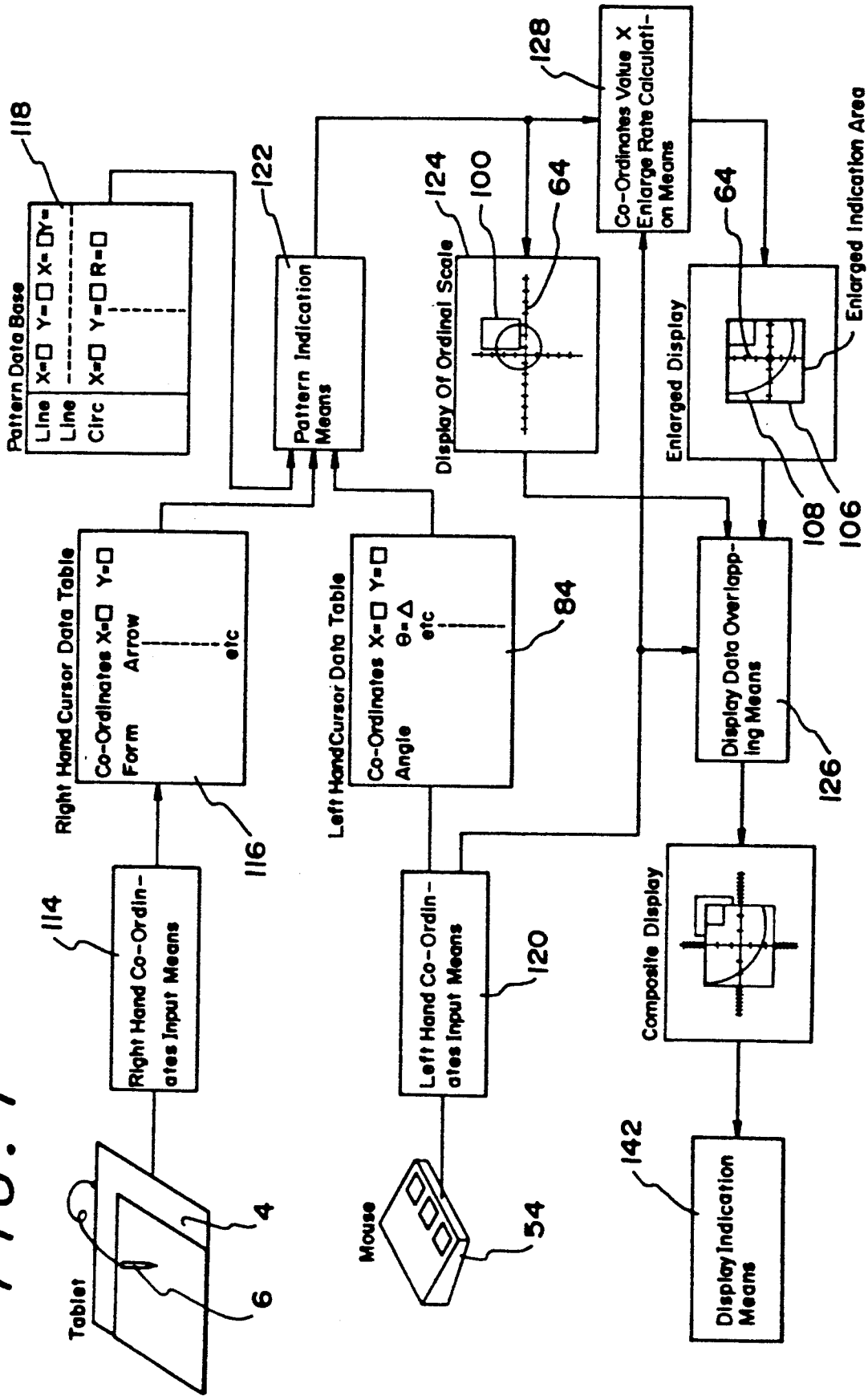
FIG. 1 is a block diagram of the input device for CAD according to the present invention.
Figure 2:
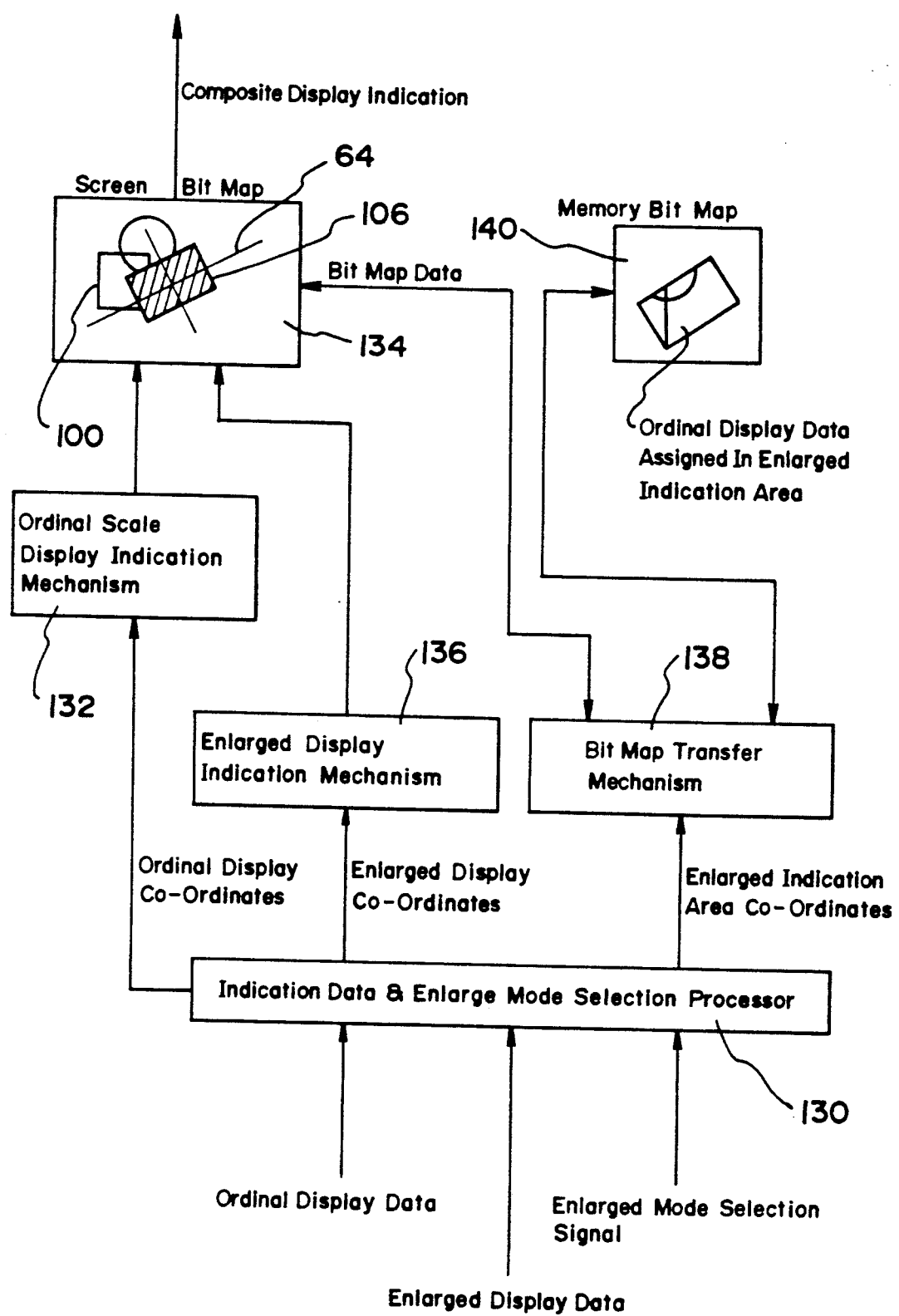
FIG. 2 is another block diagram of the input device for CAD of the present invention.
Figure 3:
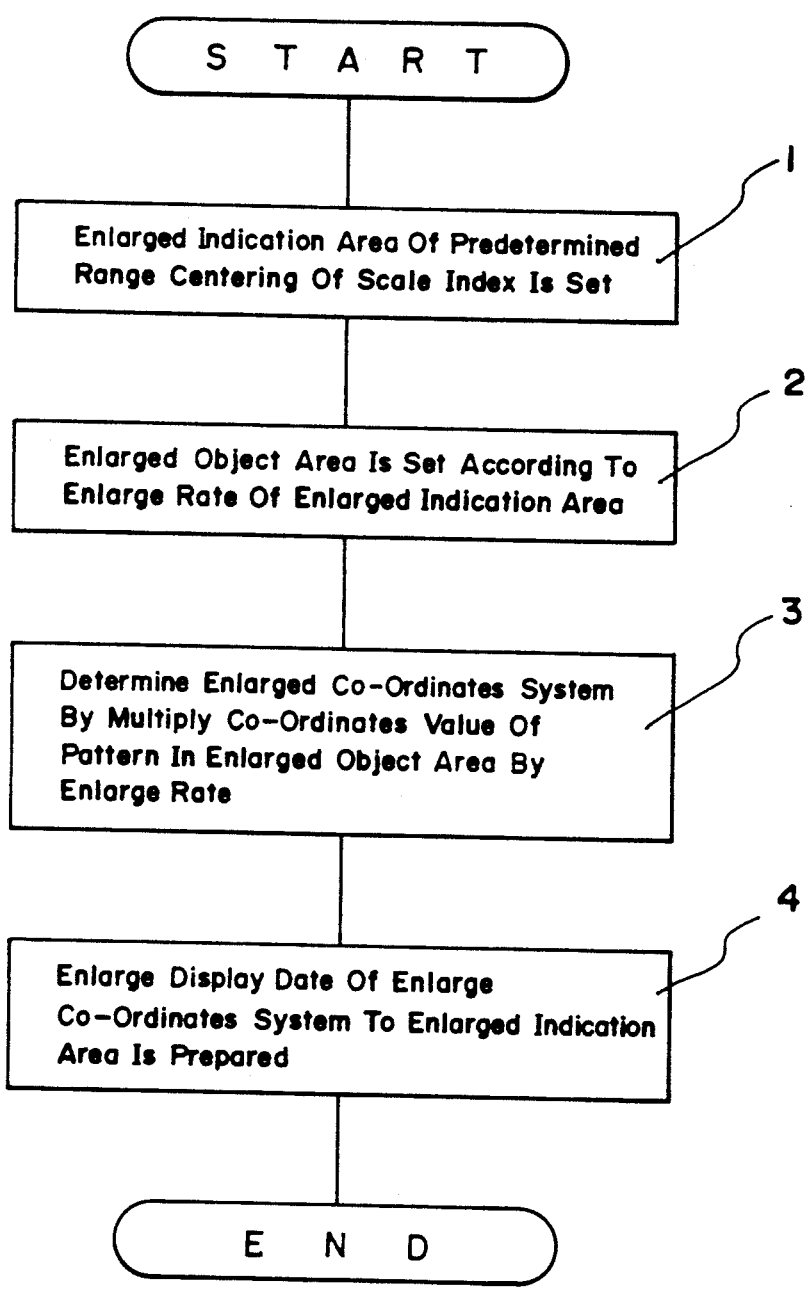
FIG. 3 is a flowchart of the input device.

Next, the operation of the enlarge display overlapping means will be described with reference to FIGS. 1 to 3.

A right hand co-ordinates input means 114 supplies the co-ordinates signal of a point indicated by the cursor device 6 on the digitizer 4 to a right hand cursor data table 116 in order to rewrite the memory data of the table 116. A cursor of an arrow is shown on the screen of the display device or the digitizer 4 in order to indicate the position of the cursor device 6 (see FIG. 14). The right hand cursor data table 116 memorizes the shape of this arrow and the co-ordinates position data. A shape data base 118 contains various drafting data for line drafting and circle drafting and the like. A left hand co-ordinates input means 120 supplies an output signal of a co-ordinates data of the cursor device 54 to a left hand cursor data table 84 in order to rewrite an XY co-ordinates data of the center point of the right angle scale lines 64 or an angle θ data stored in the left hand cursor data table 84. A shape indication means 122 creates an indication data to be indicated on the digitizer 4 according to data of the left hand cursor data table 84 and the shape data base 118. The indication data as shown by a block 124 is constructed by a shape 100 indicated by the cursor device 6 and data of the right angle scale lines 64 controlled by the cursor device 54. While, when an enlarge mode is selected by the cursor device 54, an enlarge mode selection signal is supplied from the left hand co-ordinates input means 120 to a display data overlapping means 126. The enlarge mode selection signal and an enlarging rate set signal are inputted from the left hand co-ordinates input means 120 to a co-ordinates value multiply enlarging rate counting means 128. When the enlarge mode is selected, the co-ordinates value multiply enlarging rate counting means 128 starts its counting operation.

The counting operation will be explained with reference to a flowchart shown in FIG. 3

First, in a step 1, an enlarge indication area 106 (see FIG. 5) having a predetermined area or range in regard to the center of the right angle scale lines 64 is set. Next, an enlarging area 110 or 112 is set according to an enlarge rate in regard to the enlarge indication area 106. In a step 3, the co-ordinates value of the shape in the enlarge indication area 106 is multiplied by an enlarge rate in order to determine an enlarged co-ordinates system. Line widths of the shape according to the enlarged co-ordinates system are identical with that of the shape in the ordinal co-ordinates system. In a step 4, an enlarged display data of the enlarged co-ordinates system in regard to the enlarge indication area 106 is prepared. This enlarged display data and an ordinal display data outputted from the shape indication means 12 are inputted into the display data overlapping means 126. It is noted that the display data overlapping means 126 has an indication data and enlarge mode selection processor 130 outputting ordinal display co-ordinates and enlarge display co-ordinates. The ordinal display co-ordinates is supplied to an ordinal size display indication mechanism 132 developing the ordinal display data on the screen bit map 134 of the display device. While, enlarge display co-ordinates are supplied from the processor 130 to an enlarged display indication mechanism 136, thus, an enlarged display data is developed in the enlarge indication area 106 of the screen bit map 34. The co-ordinates of the enlarge indication area 106 is supplied to a bit map transfer mechanism 138, so that an ordinal display data corresponding to the enlarge indication area 106 in the bit map data is drawn according to the co-ordinates of the enlarge indication area 106 and the bit map data of the screen bit map 134, and the ordinal display data is temporarily memorized in the memory bit map 140. The data of the enlarged screen or display and the ordinal display developed on the screen bit map 134 are supplied to a display indication means 142, so a composite scene is displayed on the digitizer 4. When the shape is treated by the cursor device 6 using the enlarged co-ordinates system in the enlarge indication area 106, the ordinal display data corresponding to and in the enlarge indication area 106 is treated in shape by an ordinal co-ordinates system. That is, when the cursor device 6 draws, for example, a circle passing through a point on the circumference indicated by the cursor device 6 in the enlarge indication area 106 surrounding the center point indicated by the cursor device 6, or a line joining two points in the indication area 106, the data is translated into an ordinal co-ordinates system, transferred to the memory bit map 140 by the bit map transfer mechanism 138, and finally treated in pattern on the memory bit map 140. Consequently, when the mode returns from an enlarge mode to an ordinal one and the data of the memory bit map 140 returns to the screen bit map 134, the data is shown on the digitizer 4 after the data is treated in pattern in the enlarge indication area 106. Screen bit map 134, bit map transfer mechanism 138, and memory bit map 140 constructs a memory means for temporarily storing the pattern or shape data in the enlarge indication area 106 as a pattern or shape data of the ordinal co-ordinates system.

According to the present invention, as described above, the width of the right angle scale lines and the pattern is constant even when the pattern expands in the enlarge indication area, so that is becomes easy to carry out a pattern treatment in the enlarge indication area, as well as it is possible to carry out a pattern treatment by a single cursor device while another cursor device moves the pattern in the enlarge indication area.

What is claimed is:

1. An input device for a CAD system, comprising: a drafting board-like digitizer on which a scene of a display device is shown, and a first cursor device for inputting a position signal to a control apparatus, wherein an indication position of the first cursor device, which is used by an operator to indicate a point on the digitizer, on said digitizer and another indication position on the screen of the display device are made to agree with each other on the digitizer, and drafting is carried out on the screen of the display device after inputting of the position signal, the input device comprising: means for displaying graduated right angle scale lines on the screen of said display device, a second cursor device for controlling the right angle scale lines, said second cursor device being installed separately from said first cursor device, control means for moving said right angle scale lines in parallel and circularly on the screen according to an output signal of the second cursor device, a co-ordinate value multiply enlargement rate counting means for setting an enlarge indication area of a predetermined range in regard to the center of said right angle scale lines on the screen of the display device, setting an area-to-be-enlarged at the enlargement rate of the enlarge indication area, multiplying the co-ordinate value of the pattern in the area-to-be-enlarged by the enlarge rate in order to determine an enlarged co-ordinate system having a line width fixed at its original unenlarged width, display data overlapping means for composing or overlapping the enlarge display data of said co-ordinate value multiply enlargement rate counting means on ordinal display data in order to display the composite data on the screen of the display device, and memory means for temporarily storing pattern data in said enlarge indication area as pattern data of an ordinal co-ordinate system.

2. The input device according to claim 1, wherein the enlarge indication area is adapted to be able to move by the second cursor device and the enlarge indication area is adapted to be overlapped on the original pattern and displayed.

* * * * *